United States Patent
Shiga

(10) Patent No.: US 9,025,171 B2
(45) Date of Patent: May 5, 2015

(54) IMAGE FORMING SYSTEM, IMAGE FORMING APPARATUS, AUTHENTICATION SERVER, CLIENT PERSONAL COMPUTER, AND CONTROL METHOD OF IMAGE FORMING APPARATUS

(71) Applicant: Shinichi Shiga, Tokyo (JP)

(72) Inventor: Shinichi Shiga, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/897,561

(22) Filed: May 20, 2013

(65) Prior Publication Data

US 2013/0314736 A1   Nov. 28, 2013

(30) Foreign Application Priority Data

May 22, 2012   (JP) .................................. 2012-116467

(51) Int. Cl.
| | |
|---|---|
| G06F 3/12 | (2006.01) |
| G06K 15/00 | (2006.01) |
| H04N 1/44 | (2006.01) |
| G06F 21/60 | (2013.01) |
| G06F 21/84 | (2013.01) |
| H04N 1/00 | (2006.01) |

(52) U.S. Cl.
CPC ............ *G06F 3/1293* (2013.01); *H04N 1/4486* (2013.01); *G06F 21/608* (2013.01); *G06F 21/84* (2013.01); *H04N 1/00222* (2013.01); *H04N 1/4426* (2013.01); *H04N 1/4433* (2013.01)

(58) Field of Classification Search
None
See application file for complete search history.

(56) References Cited

U.S. PATENT DOCUMENTS

2004/0021895 A1*   2/2004   Lay et al. ..................... 358/1.15
2006/0075474 A1*   4/2006   Takeuchi et al. .................. 726/5

FOREIGN PATENT DOCUMENTS

| JP | 2009-177560 | 8/2009 |
|---|---|---|
| JP | 2009-278178 | 11/2009 |

* cited by examiner

*Primary Examiner* — Thomas Lett
(74) *Attorney, Agent, or Firm* — Harness, Dickey & Pierce, P.L.C.

(57) ABSTRACT

An image forming apparatus for use in an image forming system that includes the image forming apparatus, a client PC, and an authentication server is disclosed. The image forming apparatus may include a cryptographic communication unit configured to perform secure communications, a parameter setting unit configured to set parameters for performing encryption in the image forming apparatus itself, an access right setting unit configured to set an access right of the image forming apparatus itself, a transmission unit configured to transmit the parameters according to an authentication result of the access right, and an automatic setting unit configured to automatically set the parameters by an operation from the client PC.

4 Claims, 3 Drawing Sheets

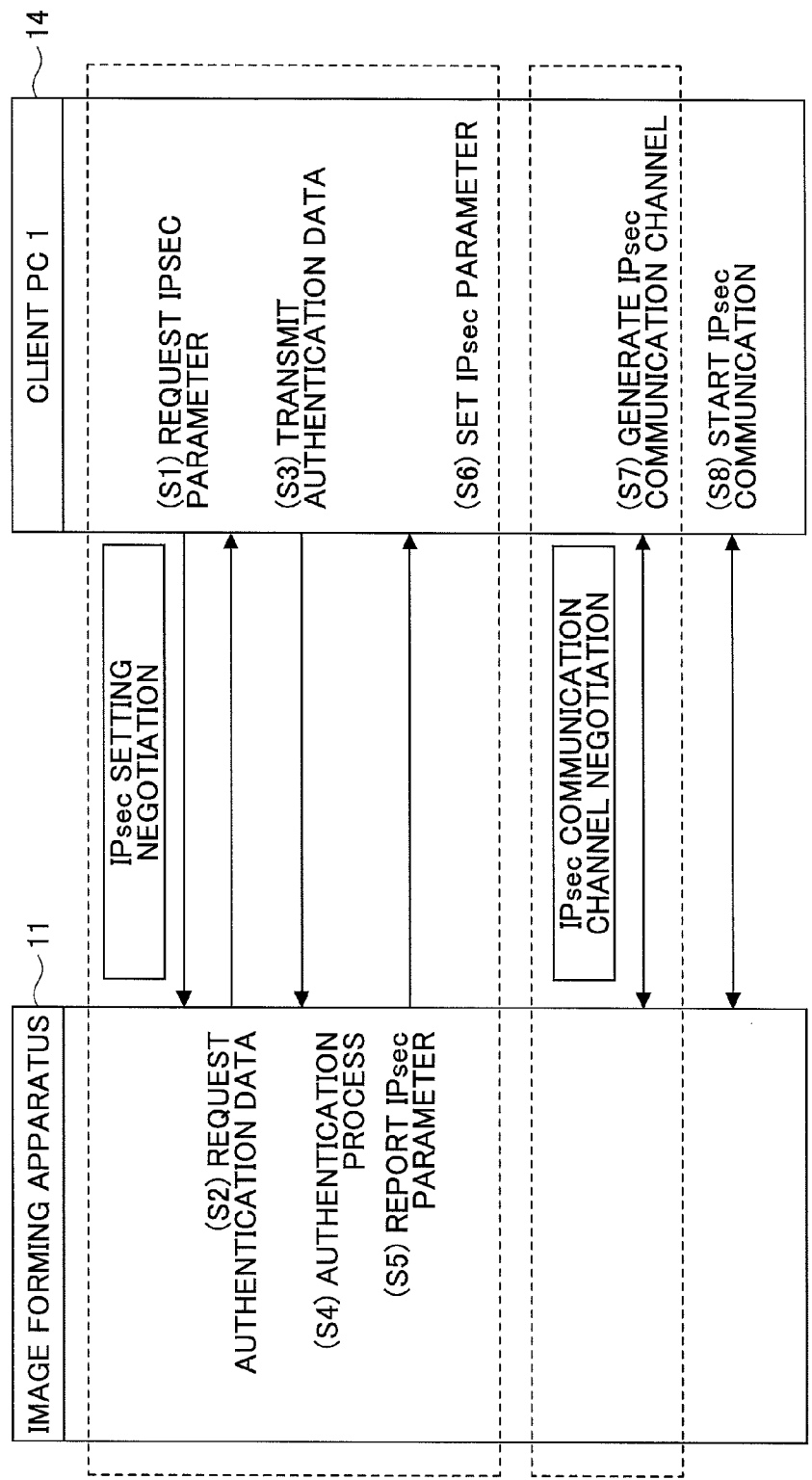

IMAGE FORMING SYSTEM, IMAGE FORMING APPARATUS, AUTHENTICATION SERVER, CLIENT PERSONAL COMPUTER, AND CONTROL METHOD OF IMAGE FORMING APPARATUS

BACKGROUND OF THE INVENTION

1. Field of the Invention

The disclosures discussed herein generally relate to an image forming system, an image forming apparatus, an authentication server, a client personal computer (PC), a control method of the image forming apparatus, and a non-transitory recording medium storing a program implementing the control method.

2. Description of the Related Art

There is a communication system utilizing an Internet protocol security (IPsec) known in the art. The IPsec is a protocol utilized for providing a tamper prevention function or a concealing function for each of IP packets of a communication session by utilizing a cryptographic technology. The IPsec may enable the communications in the transport layer or the application layer that does not support a cryptographic technology without allowing the communication contents to be tampered with or to be eavesdropped while the communications are performed.

The IPsec is composed of an authentication mechanism and a guarantee of the integrity of data provided by an authentication header, a security protocol such as data encryption implemented by encapsulated security payload (ESP), and a key exchange achieved by an Internet key exchange protocol (IKE).

The communications with IPsec may require setting the same security policy between communication partners in advance. However, the settings of such a security policy may require specialized technical knowledge. Further, since numerous items need to be set for the security policy, numerous errors may be induced.

There is disclosed a technology for setting such a same security policy between communication partners in advance. In this technology, a cryptographic communication channel encrypted by a secure socket layer (SSL) or the like that differs from the IPsec may be utilized between a personal computer and an image forming apparatus such as a printer to transmit IPsec settings from the PC to the image forming apparatus so as to automatically set the transmitted IPsec settings in the image forming apparatus.

In the above technology to transmit the IPsec settings via the cryptographic communication channel encrypted by the SSL, the setting values are encrypted and therefore will not be leaked by interception or eavesdropping. However, it may relatively be easy to establish the SSL between any types of communication partners such that a third party may be able to acquire the setting values quite easily.

Further, in the above technology, parameters of the IPsec settings are sent from the client PC to the image forming apparatus, which indicates that IPsec settings for the client PC are required.

However, specialized technical knowledge may be required for setting the IPsec, and further, the IPsec settings may be required for each of the client PCs.

Japanese Laid-open Patent Publication No. 2009-177560, for example, discloses a technology that enables a novice user having no advance knowledge of the IPsec to set the IPsec.

In the technology disclosed in Patent Document 1, the SSL communications are established between the client PC and the image forming apparatus, and the setting parameters necessary for the IPsec communication are sent from the client PC to the image forming apparatus. Then the IPsec parameter setting part disposed in the image forming apparatus then sets the received setting parameters in the IPsec function part of the image forming apparatus.

However, the technology disclosed in Patent Document 1 may still allow the third party to acquire the setting values, and may still require the IPsec settings for the client PC.

RELATED ART DOCUMENT

Patent Document

Patent Document 1: Japanese Laid-open Patent Publication No. 2009-177560

SUMMARY OF THE INVENTION

Accordingly, it is a general object in one embodiment of the present invention to provide a novel and useful image forming system, image forming apparatus, authentication server, client PC, control method of the image forming apparatus, and non-transitory computer-readable storage medium having a program to execute the control method capable of automatically setting parameters of the client PC when setting parameters of the image forming apparatus are sent from the image forming apparatus to the client PC, which may substantially eliminate one or more problems caused by the limitations and disadvantages of the related art.

According to one aspect of the embodiment, there is provided an image forming apparatus for use in an image forming system, which includes the image forming apparatus configured to transmit a scanned result of a document to a client PC and print printing data received from the client PC; the client PC configured to receive the scanned result of the document and transmit the printing data to the image forming apparatus; and an authentication server configured to manage access rights of the image forming apparatus and the client PC, receive an authentication request from the image forming apparatus and transmit a report on a result of performing an authentication process to the image forming apparatus. The image forming apparatus includes a cryptographic communication unit configured to perform secure communications; a parameter setting unit configured to set parameters for performing encryption in the image forming apparatus itself; an access right setting unit configured to set an access right of the image forming apparatus itself; a transmission unit configured to transmit the parameters according to an authentication result of the access right; and an automatic setting unit configured to automatically set the parameters by an operation from the client PC.

According to another aspect of the embodiment, there is provided a control method of an image forming apparatus for use in an image forming system, the system including the image forming apparatus configured to transmit a scanned result of a document to a client PC and print printing data received from the client PC, the client PC configured to receive the scanned result of the document and transmit the printing data to the image forming apparatus, and an authentication server configured to manage access rights of the image forming apparatus and the client PC, receive an authentication request from the image forming apparatus and transmit a report on a result of performing an authentication process to the image forming apparatus. The control method includes setting parameters for performing encryption in the image forming apparatus to perform secure communications; setting an access right of the image forming apparatus itself;

transmitting the parameters according to an authentication result of the access right; and automatically setting the parameters by an operation from the client PC.

According to another aspect of the embodiment, there is provided an image forming system that includes an image forming apparatus configured to transmit a scanned result of a document and print printing data; a client PC configured to receive the scanned result of the document from the image forming apparatus and transmit the printing data to the image forming apparatus; and an authentication server configured to manage access rights of the image forming apparatus and the client PC, receive an authentication request from the image forming apparatus and transmit a report on a result of performing an authentication process to the image forming apparatus.

Additional objects and advantages of the embodiments will be set forth in part in the description which follows, and in part will be obvious from the description, or may be learned by practice of the invention.

It is to be understood that both the foregoing general description and the following detailed description are exemplary and explanatory only and are not restrictive of the invention as claimed.

Other objects and further features of the present invention will be apparent from the following detailed description when read in conjunction with the accompanying drawings.

BRIEF DESCRIPTION OF THE DRAWINGS

FIG. 3 is a sequence diagram illustrating an example of an automatic setting sequence of a specific automatic setting process of IPsec parameters.

DESCRIPTION OF THE PREFERRED EMBODIMENTS

Outline

An image forming system according to an embodiment includes causing a user authentication function of an image forming apparatus such as a printer to verify an access right of a user of a client PC to the image forming apparatus for an automatic setting process of IPsec setting parameters; causing the image forming apparatus such as a printer to transmit the IPsec setting parameters; and causing the client PC to automatically apply the IPsec setting parameters.

Embodiments

Configuration

Figure 1:
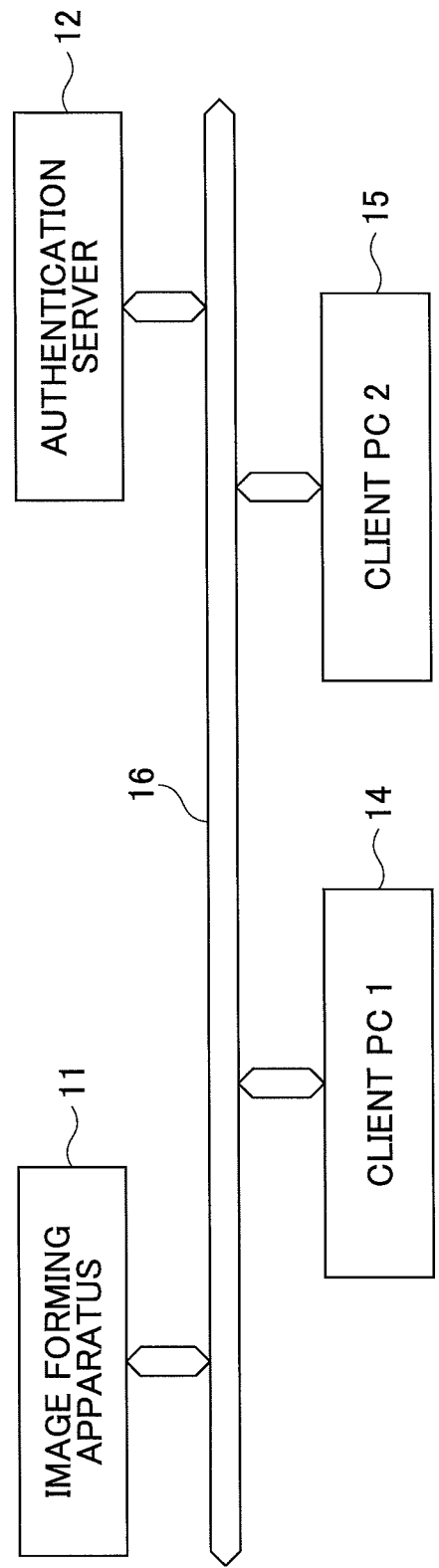
FIG. 1 is a network configuration diagram illustrating an image forming system according to an embodiment.

FIG. 1 is a network configuration diagram illustrating an image forming system according to an embodiment.

As illustrated in FIG. 1, the image forming system includes an image forming apparatus 11, an authentication server 12, and two client PCs 14 and 15 that are mutually connected via a network cable 16.

The image forming apparatus 11 is configured to transmit a scanned result of a document to the client PCs 14 and 15, or print printing data received from the client PCs 14 and 15 on a sheet of paper. The image forming apparatus includes a network interface such that the image forming apparatus may be capable of performing secure communications utilizing IPsec. The client PCs 14 and 15 are configured to receive the scanned data, or transmit the printing data to the image forming apparatus 11. The authentication server 12 is configured to manage access rights of the client PCs 14 and 15, receive an authentication request from the image forming apparatus 11, and transmit a report on a result of performing an authentication process to the image forming apparatus 11. The authentication server 12 includes functions authorized for each of users such that the authentication server 12 transmits a report on information associated with the authorized functions for a corresponding one of the users together with the result of the authentication process.

Figure 2:
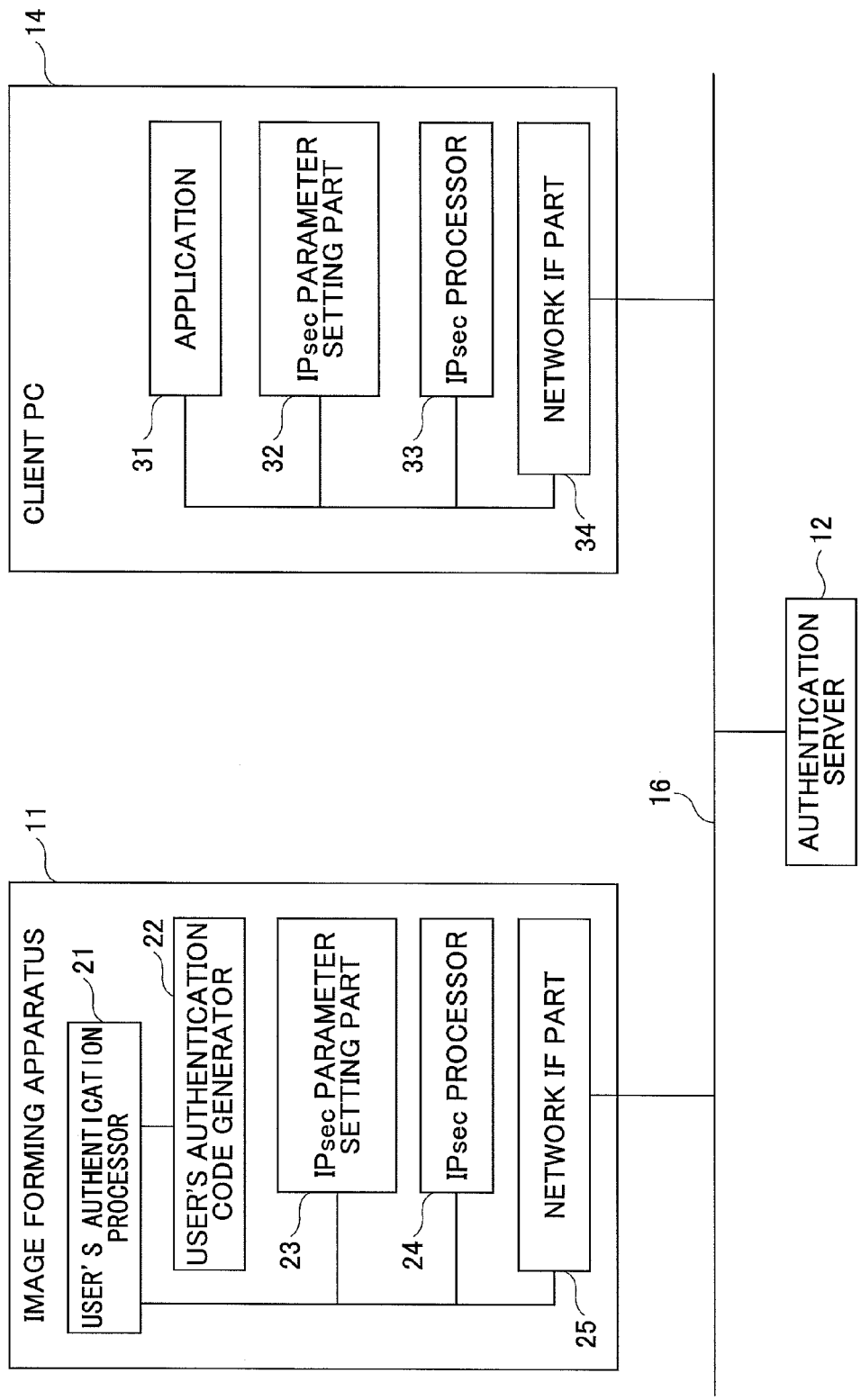
FIG. 2 is an example of a functional block diagram illustrating a software configuration according to an embodiment.

FIG. 2 is an example of a functional block diagram illustrating a software configuration according to an embodiment. The image forming apparatus 11 includes a user authentication processor 21, a user authentication code generator 22, an IPsec parameter manager setting part 23, an IPsec processor 24, and a network IF part 25.

In the image forming apparatus 11, the network IF part 25 is configured to control network devices, set IP addresses in the network devices, and perform data transmission and reception processes. The IPsec processor 24 is configured to process IPsec protocols while referring to IPsec parameters managed by the IPsec parameter manager setting part 23. The IPsec parameter manager setting part 23 is configured to set and manage various parameters that are referred to by the IPsec processor 24. The IPsec parameter manager setting part 23 is configured to further include a function to negotiate with the client PC 14 the IPsec parameters between the client PC 14 and the image forming apparatus 11 itself, and to maintain the IPsec parameters.

The client PC 14 includes an application part 31, an IPsec parameter setting part 32, an IPsec processor 33, and a network IF part 34. The user authentication processor 21 is configured to perform a process of transmitting a query about access rights of the image forming apparatus 11 in the authentication server 12. The user authentication code generator 22 is configured to generate a user authentication code to be transmitted to the client PC 14.

The IPsec parameter setting part 32 is configured to set the IPsec parameters received from the image forming apparatus 11 to the client PC 14. The application part 31 is configured to generate printing data, transmit the printing data to the image forming apparatus 11, receive data scanned by the image forming apparatus 11 and store the received scanned data in a hard disk.

Note that the user authentication processor 21 corresponds to a setting unit configured to set the access rights for the image forming apparatus 11. The user authentication processor 22 corresponds to a setting unit configured to set the access rights of the image forming apparatus 11. The IPsec parameter manager setting part 23 corresponds to a setting unit configured to set the IPsec parameters in the image forming apparatus 11, and also in a not-illustrated transmission unit configured to transmit the IPsec parameters according to an authentication result of the access rights of the image forming apparatus 11. The IPsec processor 24 corresponds to an encryption processing part of a cryptographic communication unit for performing secure IPsec communications. The network IF part 25 corresponds to a communication unit of the cryptographic communication unit for performing secure IPsec communications. Note that a user information communication unit of the client PC 14 configured to transmit the user information to the image forming apparatus 11, and an automatic IPsec parameter setting unit of the client PC 14 configured to automatically set IPsec parameters correspond to the IPsec parameter setting unit 32 of the client PC 14.

Operation

FIG. 3 illustrates an example of an automatic setting sequence of a specific automatic setting process of the IPsec parameters.

The client PC 14 negotiates for the IPsec settings to acquire the IPsec parameters from the image forming apparatus 11 before initiating the IPsec communications, and sets the acquired IPsec parameters in the client PC 14 itself. The above procedure of the automatic setting process of the IPsec parameters is described below.

Initially, the client PC 14 transmits a request to the image forming apparatus 11 to transmit the IPsec parameters (step S1). On receiving the request, the image forming apparatus 11 generates an authentication code, adds the generated authentication code to the authentication data request, and transmits the authentication data request with the authentication code to the client PC 14 (step S2). The client PC 14 transmits the authentication code received from the image forming apparatus 11 and user information to the forming apparatus 11 (step S3). The image forming apparatus 11 performs an authentication process utilizing the authentication code and the user information transmitted from the client PC 14 (step S4), and transmits, when an access right of a user to use the image forming apparatus 11 is authorized, IPsec parameters to the client PC 14 according to an authorization attribute (e.g., administrator or general user) of the user of the image forming apparatus 11 (step S5). When the access right is unauthorized, subsequent processes are not performed. On receiving the IPsec setting information from the image forming apparatus 11, the client PC 14 sets the IPsec parameters in the client PC 14 itself utilizing the received IPsec setting information (step S6). The IPsec setting negotiation is thus completed. Subsequently, information for generating an IPsec communication channel is mutually transmitted and received between the client PC 14 that has completed the IPsec setting and the image forming apparatus 11 (step S7). When the generation of the IPsec communication channel has been completed, IPsec communications may be enabled between the image forming apparatus 11 and the client PC 14 (step S8).

TABLE 1

| | |
|---|---|
| AUTHENTICATION DATA | INFORMATION FOR AUTHENTICATING ACCESS AUTHORIZATION TO THE APPARATUS |
| USER ID | USER ID FOR ACCESSING THE APPARATUS |
| PASSWORD | PASSWORD FOR ACCESSING THE APPARATUS |
| IPsec PARAMETER | REPORT FOLLOWING IPsec PARAMETERS ACCORDING TO USER'S ACCESS AUTHORIZATION ATTRIBUTE AS A RESULT OF AUTHENTICATION PROCESS |
| SECURITY PROTOCOL | AH OR ESP |
| CRYPTOGRAPHIC ALGORITHM | CRYPTOGRAPHIC ALGORITHMS SUCH AS DES/3DES/AE |
| AUTHENTICATION ALGORITHM | AUTHENTICATION ALGORITHMS SUCH AS HMAC-SHA-1/HMAC-SHA-256 |
| ENCAPSULATION MODE | TRANSPORT/TUNNEL MODE |
| PFS GROUP | PFS GROUP NO. FOR USING PFS |
| IPsec VALID DURATION | IPsec VALID DURATION IS SET BY THE NUMBER OF SECONDS OR THE NUMBER OF BYTES |

Table 1 illustrates specific contents of the IPsec settings to be transmitted and received while performing the negotiations. Table 1 illustrates information to be transmitted and received between the client PC 14 and the image forming apparatus 11 while performing the negotiations. The authentication data are information to be transmitted from the client PC 14 to the image forming apparatus 11 for authenticating an access right to the image forming apparatus 11. The image forming apparatus 11 allows the authentication server to authenticate the authentication data transmitted from the client PC 14, sets the IPsec information according to authorization given to each of the user IDs for each of items of the IPsec parameters, and transmits the IPsec parameter settings to the client PC 14.

AH illustrated in Table 1 serving as a security protocol provides an authentication function and a tamper-prevention function. However, the AH does not provide an encryption function such that the data themselves will not be encrypted. Hence, the AH is not usable as an eavesdrop prevention function. Further, ESP is configured to encrypt a payload part. That is, a part of the data excluding an IP header, a routing header, and a hop-by-hop option header are encrypted.

Effects

According to the disclosed embodiments, the user authentication function of the image forming apparatus such as a printer may verify the access right of a user of the client PC to the image forming apparatus, allows the transmission of the IPsec setting parameters to the image forming apparatus such as a printer, and allows the client PC to automatically apply the IPsec setting parameters. Hence, the user having the access right to the image forming apparatus may be able to automatically apply the IPsec communication settings to the client PC. Further, according to the image forming system, a security level may be increased in compliance with the authorization attribute of the user (administrator or general user).

Program

The image forming apparatus according to the above-described embodiments may be implemented by causing a computer to execute a program. Examples of the computer include a general purpose computer such as personal computer (PC) or a workstation; however, the computer utilized in the embodiments is not limited to these examples. Hence, an example of implementing the embodiment by executing the program is illustrated as follows.

For example, such a program may be a control program of an image forming apparatus for use in an image forming system.

The image forming system includes the image forming apparatus configured to transmit a scanned result of a document to a client PC and print printing data received from the client PC; the client PC configured to receive the scanned result of the document and transmit the printing data to the image forming apparatus; and an authentication server configured to manage access rights of the image forming apparatus and the client PC, receive an authentication request from the image forming apparatus and transmit a report on a result of performing an authentication process to the image forming apparatus, the control program, when executed by a processor, causing a computer to perform as a cryptographic communication unit to perform secure communications; causing a setting unit to set parameters for performing encryption; causing an access right setting unit to set access rights; causing a transmission unit to transmit the parameters according to an authentication result of a corresponding one of the access rights; and causing an automatic setting unit to set the parameters by an operation from the client PC.

Thus, the control program of the image forming apparatus may implement the image forming apparatus according to the above-described embodiments anywhere insofar as there is a computer environment in which the control program is executable. Such a program may be stored in a non-transitory computer readable storage medium.

Storage Medium

Examples of the storage medium include a computer readable storage medium such as a compact disc read only memory (CD-ROM), a flexible disk (FD), and a compact disc recordable (CD-R), a semiconductor memory such as a flash memory, a random access memory (RAM), a read only memory (ROM), a ferroelectric random access memory (Fe-RAM), and a hard disk drive (HDD).

According to the disclosed embodiments, when the setting parameters of the image forming apparatus are transmitted to the client PC, the client PC automatically sets the setting parameters in the client PC itself.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made hereto without departing from the spirit and scope of the invention.

This application is based on and claims the benefit of priority of Japanese Patent Application No. 2012-116467, filed on May 22, 2012, the entire contents of which are hereby incorporated herein by reference.

What is claimed is:

1. An image forming apparatus for use in an image forming system, the system including the image forming apparatus configured to transmit a scanned result of a document to a client PC and print printing data received from the client PC, the client PC configured to receive the scanned result of the document and transmit the printing data to the image forming apparatus, and an authentication server configured to manage access rights of the image forming apparatus and the client PC, receive an authentication request from the image forming apparatus and transmit a report on a result of performing an authentication process to the image forming apparatus, the image forming apparatus comprising:

a cryptographic communication unit configured to perform secure communications;

a parameter setting unit configured to set parameters for perfoi ruing encryption in the image forming apparatus itself;

an access right setting unit configured to set an access right of the image forming apparatus itself;

a transmission unit configured to transmit the parameters according to an authentication result of the access right; and an automatic setting unit configured to automatically set the parameters by an operation from the client PC.

2. The image forming apparatus as claimed in claim 1, further comprising:

a setting unit configured to set the parameters for each of users when the access right is set.

3. A control method of an image forming apparatus for use in an image forming system, the system including the image forming apparatus configured to transmit a scanned result of a document to a client PC and print printing data received from the client PC, the client PC configured to receive the scanned result of the document and transmit the printing data to the image forming apparatus, and an authentication server configured to manage access rights of the image forming apparatus and the client PC, receive an authentication request from the image forming apparatus and transmit a report on a result of performing an authentication process to the image forming apparatus, the control method, comprising:

setting parameters for performing encryption in the image forming apparatus to perform secure communications;

setting an access right of the image forming apparatus itself;

transmitting the parameters according to an authentication result of the access right; and automatically setting the parameters by an operation from the client PC.

4. The control method as claimed in claim 3, further comprising:

setting the parameters for each of users when the access right is set.

* * * * *